Figure 1B:
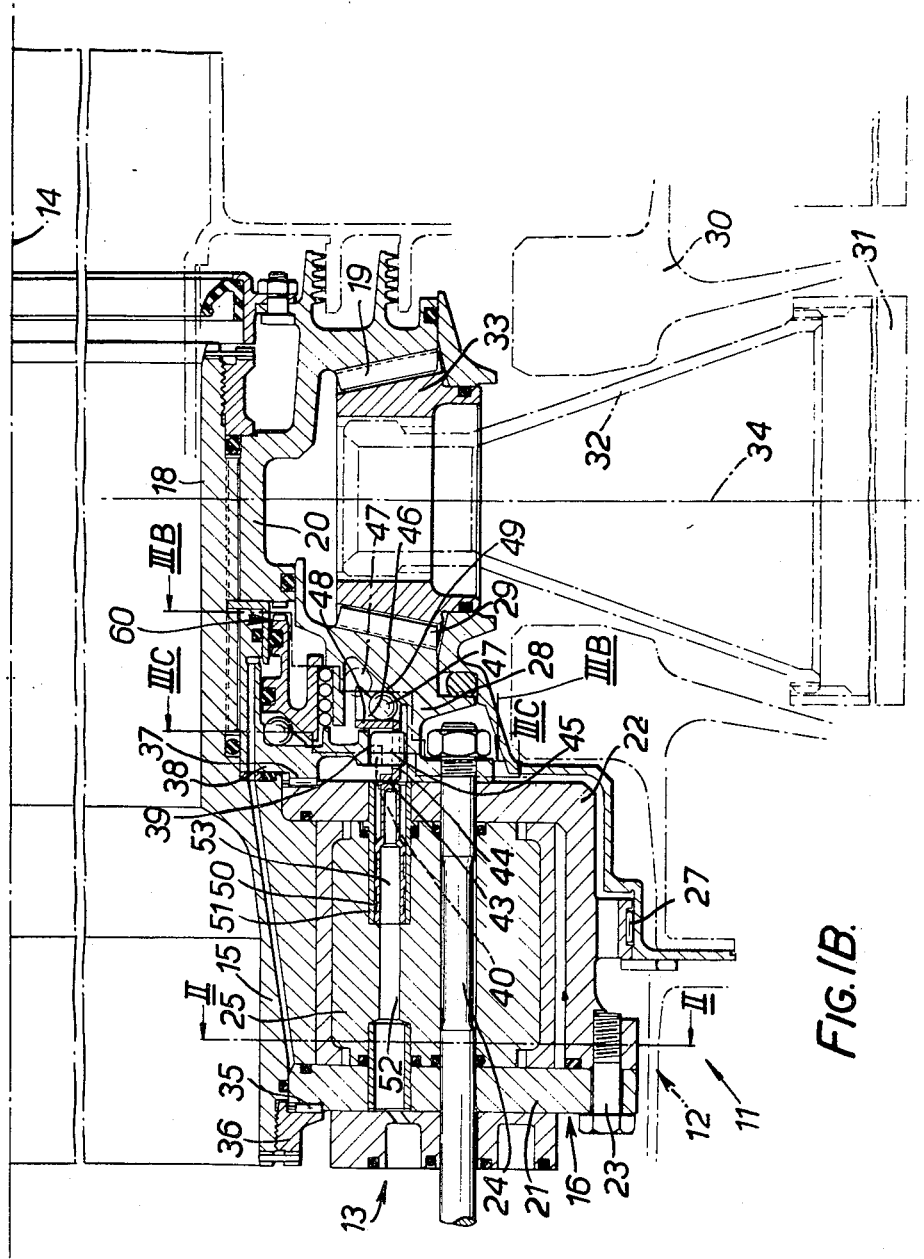

United States Patent [19]

Hunt

[11] 3,976,397
[45] Aug. 24, 1976

[54] ROTARY ACTUATORS SUITABLE FOR BLADED ROTORS

[75] Inventor: John Owen Hunt, Hucclecote, England

[73] Assignee: Dowty Rotol Limited, England

[22] Filed: Mar. 29, 1974

[21] Appl. No.: 456,210

[30] Foreign Application Priority Data
Apr. 18, 1973 United Kingdom............... 18734/73

[52] U.S. Cl. ................................ 416/154; 92/27; 416/46; 416/157 A
[51] Int. Cl.² .................................... B64C 11/40
[58] Field of Search............. 416/157 A, 153, 154, 416/46; 92/23, 24, 27, 122, 121

[56] References Cited
UNITED STATES PATENTS

| | | | |
|---|---|---|---|
| 2,379,302 | 6/1945 | Hoover .................. | 416/154 |
| 2,412,923 | 12/1956 | Stevenson .............. | 416/157 A X |
| 2,702,602 | 2/1955 | Van Ommeren .......... | 416/158 |
| 2,781,027 | 2/1957 | Henry ................... | 92/122 |
| 2,882,975 | 4/1959 | Hirsch et al. .......... | 416/154 |
| 2,957,528 | 10/1960 | Flaugh et al. ......... | 416/154 |
| 3,003,567 | 10/1961 | Flaugh et al .......... | 416/46 |
| 3,087,554 | 4/1963 | Conn et al. ............ | 416/46 |
| 3,286,602 | 11/1966 | Butner et al. .......... | 92/28 |
| 3,379,100 | 4/1968 | Rumsey et al. .......... | 92/27 |
| 3,635,584 | 1/1972 | Chilman et al. ........ | 416/48 |
| 3,664,763 | 5/1972 | Chilman ................ | 416/157 |
| 3,720,060 | 3/1973 | Davies et al. .......... | 415/79 X |
| 3,766,831 | 10/1973 | Yeakley ................ | 92/2 |

FOREIGN PATENTS OR APPLICATIONS

| | | | |
|---|---|---|---|
| 491,923 | 4/1953 | Canada ................. | 416/154 |
| 1,272,726 | 7/1968 | Germany ................ | 416/157 A |
| 567,710 | 2/1945 | United Kingdom......... | 416/157 A |
| 883,847 | 12/1961 | United Kingdom......... | 416/154 |
| 214,726 | 8/1968 | U.S.S.R. ............... | 416/158 |

Primary Examiner—Everette A. Powell, Jr.
Attorney, Agent, or Firm—Young & Thompson

[57] ABSTRACT

A rotary actuator, suitable for use with rotors having flow-varying blading, for effecting adjustment of the blading, including two relatively-rotatable and co-axially-disposed main actuator components. Each of the components carries a respective abutment means, one of which is axially-displaceable with respect to its component between an inoperative position and an operative position, and both of which are so disposed with respect to their components that during operation of the actuator with said one abutment means in its operative position, the two abutment means cooperate to arrest relative rotational movement of said components only upon said components reaching a pre-determined relative rotational position.

11 Claims, 4 Drawing Figures

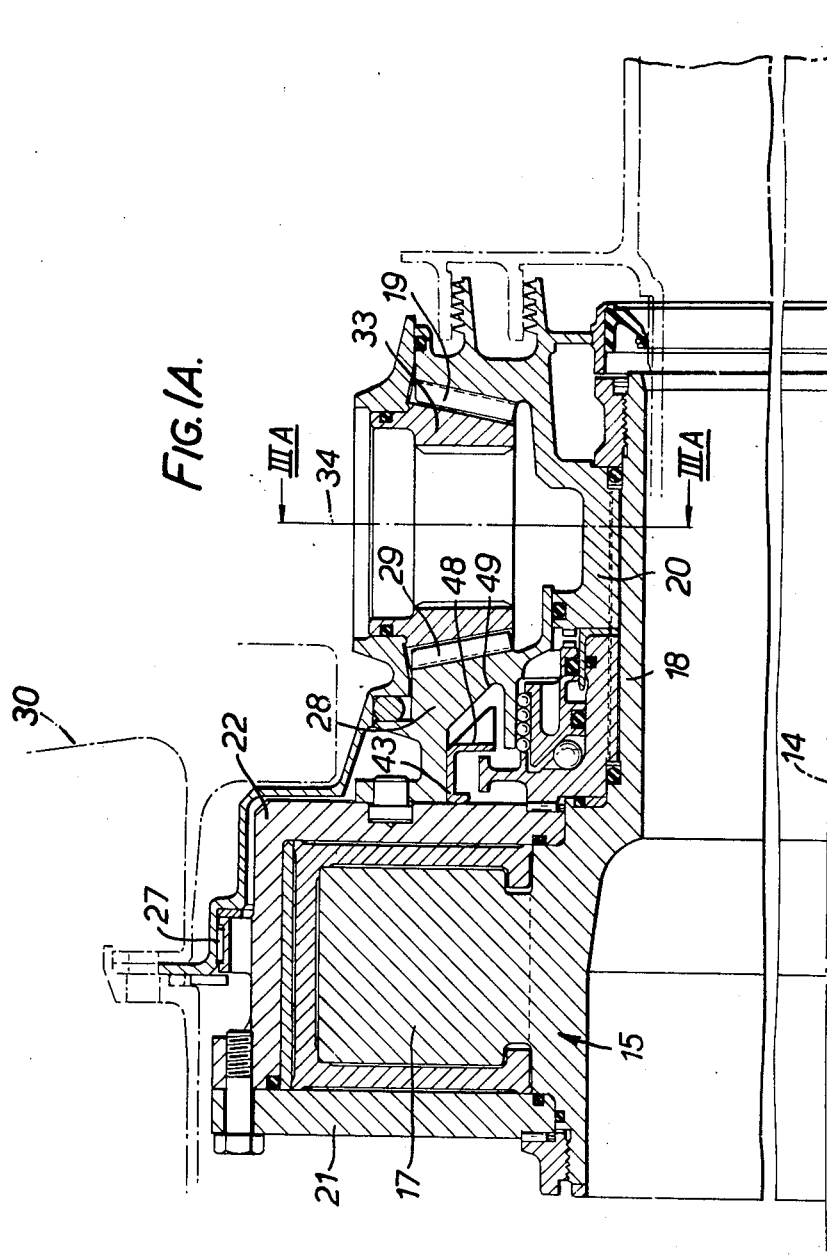

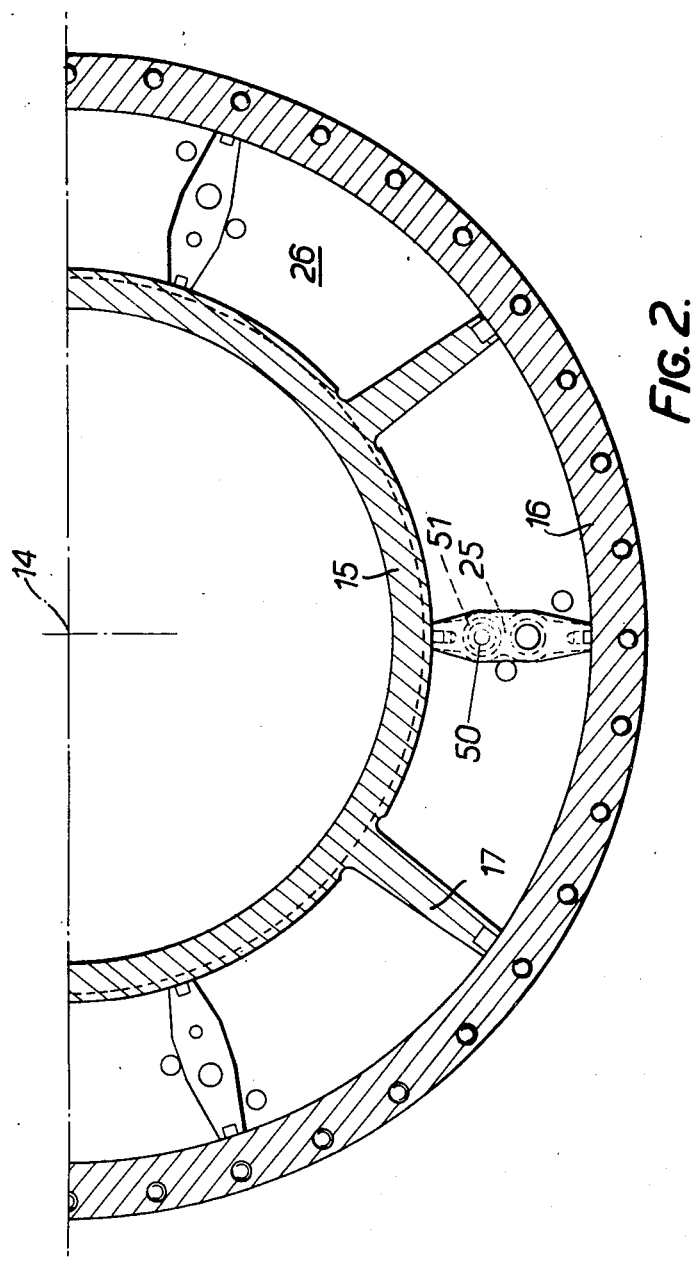

ROTARY ACTUATORS SUITABLE FOR BLADED ROTORS

This invention relates to rotary actuators, suitable for use with rotors having flow-varying blading, for effecting adjustment of the blading.

According to the invention a rotary actuator, suitable for use with rotors having flow-varying blading, for effecting adjustment of the blading, includes two relatively-rotatable and co-axially-disposed main actuator components, and each of said components carries a respective abutment means, one of said abutment means being axially-displaceable with respect to its component between an inoperative position and an operative position, and the two abutment means being so disposed with respect to their components that during operation of the actuator with said one abutment means in its operative position, the two abutment means co-operate to arrest relative rotational movement of said components only upon said components reaching a predetermined relative rotational position.

Means for so axially-displacing the displaceable abutment means may comprise devices which, when subjected to fluid under pressure, move the displaceable abutment means from said operative position to said inoperative position.

The displaceable abutment means may be biassed in a direction towards said operative position by loading means.

The displaceable abutment means may comprise a plurality of rollers circumferentially-spaced with respect to their component, and the abutment means of the ohter component may comprise a plurality of stops circumferentially-spaced with respect to that component.

The rotary actuator may be of the vane-type and said main actuator components be both of multi-vaned form.

Preferably the vane-type actuator is of the balanced kind generally as disclosed in the Specification of U.S. Pat. No.: 3,664,763.

The said devices may each comprise a piston and cylinder housed at least in part in a respective vane of the actuator.

Also according to the invention a rotor having flow-varying blading is provided with a rotary actuator for effecting adjustment of the blading, to vary flow of fluid over the blading, said actuator including two relatively-rotatable and co-axially-disposed main actuator components, and each of said components carrying a respective abutment means, one of said abutment means being axially-displaceable with respect to its component between an inoperative position and an operative position, and the two abutment means being so disposed with respect to their components that during operation of the actuator with said one abutment means in its operative position, the two abutment means co-operate to arrest relative rotational movement of said components only upon said components reaching a predetermined relative rotational position.

The displaceable abutment means may be displaceable to said inoperative position by fluid-pressure-operable devices against a bias thereon afforded by loading means. The loading means may comprise a plurality of balls or like elements which are so co-operable with a frusto-conical surface forming part of, or carried by, one component that during rotation of the rotor they load said displaceable abutment means under the centrifugal force acting on them.

Figure 3:
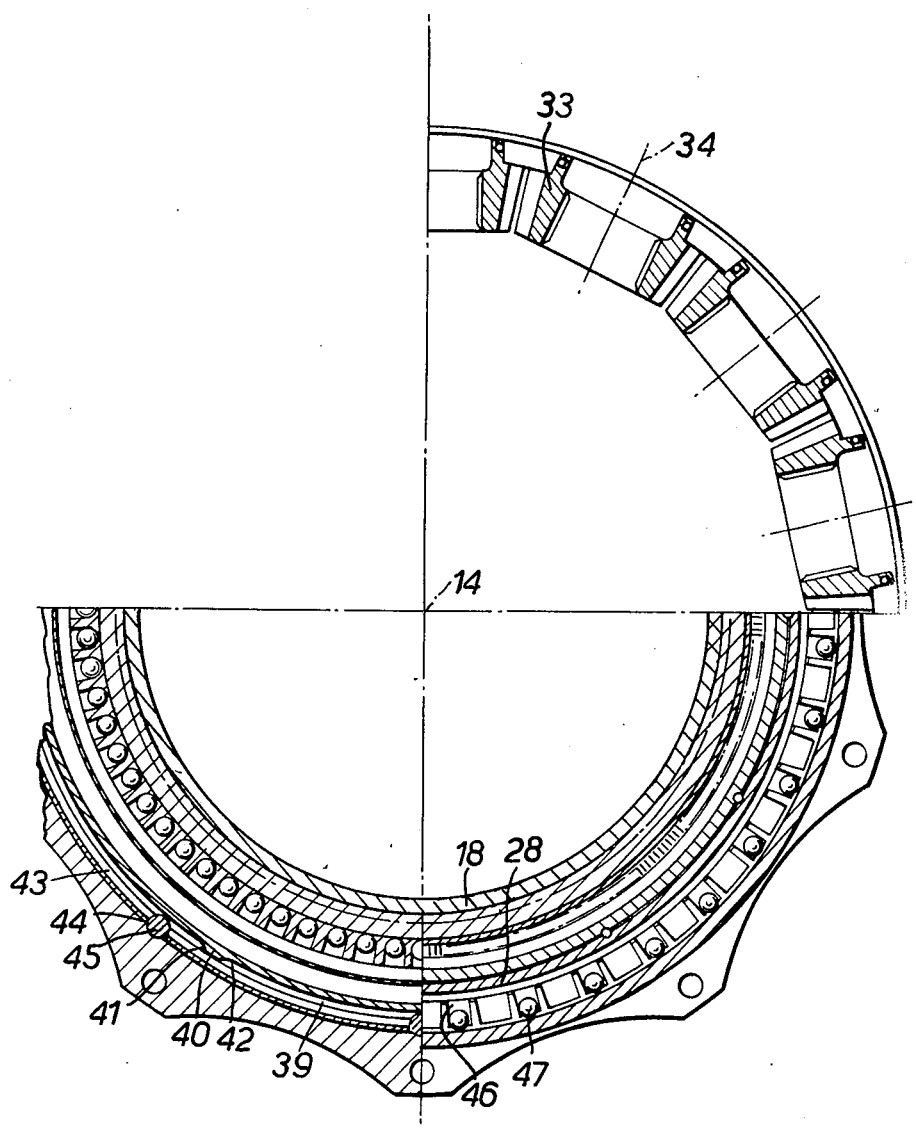

One embodiment of the invention will now be particularly described by way of example with reference to the accompanying drawings, of which, FIG. 1, comprising upper part A and lower part B, is a cross-sectional side elevation of a part of a bladed rotor having a rotary actuator for adjustment of the blading thereof, FIG. 2 is a cross-section taken along the line II—II on FIG. 1, this section being on a reduced scale, and, FIG. 3 shows three partial cross-sections, that in the upper right-hand quarter of the drawing being taken along the line IIIA—IIIA in FIG. 1, that in the lower right-hand quarter of the drawing being taken along the line IIIB—IIIB in FIG. 1, and that in the lower left-hand quarter of the drawing being taken along the line IIIC—IIIC in FIG. 1, the three sections being on a further reduced scale.

Referring to the drawings a bladed rotor 11 suitable as the fan of an aircraft gas turbine engine of the ducted-fan by-pass type includes hub structure generally indicated at 12 within which is mounted a vane-type liquid-pressure-operable rotary actuator 13 whose rotational axis is coincident with the rotational axis 14 of the bladed rotor.

In the manner as generally disclosed in the Specification of U.S. Pat. No: 3,664,763 the actuator 13 is of balanced kind and comprises two main actuator components 15 and 16, of multi-vaned form, which are rotatable in either direction, and oppositely the one with respect to the other about the axis 14. The component 15 is provided with five radially-outwardly-directed vanes 17 equi-spaced circumferentially of the component, and a shaft portion 18 thereof extends to the right in FIG. 1. A ring 19 of bevel gear teeth is formed upon a member 20 which is suitably splined upon the shaft portion 18. The component 16 comprises two casing portions 21 and 22 bolted together as at 23 and bolted as at 24 to five radially-inwardly-directed vanes 25 interposed in circumferentially equi-spaced manner between those portions. In this way ten actuator chambers 26 are provided between the vanes 17 and 25.

The component 16 is supported in a bearing 27 of suitable plastics material so as itself to be relatively rotatable with respect to the hub structure 12.

Bolted to the casing portion 22 is an annular member 28 which carries a ring 29 of bevel gear teeth, the rings 29 and 19 having their axes both coincident with the axis 14 and the teeth of one ring facing those of the other ring as shown in FIG. 1.

Mounted in suitable bearings (not shown), each within a respective socket portion as at 30 of the hub structure 12, are fourteen fan blades, one of which is shown at 31. Each fan blade is connected by means of a splined member 32 to a respective bevel gear 33 in mesh at diametrically-opposed positions thereof with the teeth of the rings 19 and 29. Thus in the manner disclosed in the above-mentioned U.S. Specification operation of the rotary actuator 13 effects rotary movement of all the bevel gears 33 in unison and thus effects adjustment of the blades 31 in either the fine pitch direction or the coarse pitch direction, as the case may be, about their longitudinal axes 34 to vary flow of air over the blades.

As also shown in FIG. 1 needle rollers 35 are provided between the casing portion 21 and a retaining ring 36 screw-threadedly engaged with the left-hand end portion of the component 15. Further needle rollers 37 are positioned as shown between the casing portion 22 and an annular member 38 generally of L-shaped cross-section which surrounds and is mounted fast upon the shaft portion 18.

The outer circumferential surface 39 of the annular member 38 is provided with nine radially-outwardly-directed stops 40 each having radiussed flanks 41 and 42 as shown in FIG. 3 and all equispaced circumferentially in predetermined positional manner on the member 38.

A ring member 43, whose axis is coincident with the axis 14, surrounds the annular member 38 and is provided with nine circumferentially equi-spaced openings 44 each of which houses a respective roller 45. These rollers are so seated in suitable recesses provided in predetermined positional manner in the annular member 28 as to be fast in the circumferential sense with respect to that member, but free in the axial sense with respect thereto. The ring member 43 is provided to the right thereof, as viewed in FIG. 1B, with thirty-six circumferentially equi-spaced radially-directed recesses or pockets 46, each pocket housing a respective ball 47 which is in engagement with a radially-directed wall 48 of the pocket and which engages a frusto-conical surface 49 formed upon the annular member 28.

The stops 40 form abutment means which, since the member 38 is fast with the shaft portion 18, is fast with respect to the main actuator component 15. The rollers 45, which are co-operable with the stops 40 and which have a rolling relationship with the surface 39 of the member 38, from displaceable abutment means carried by, and displaceable axially with respect to, the annular member 28 which in turn is fast with respect to the main actuator component 16.

The ring member 43 is axially movable together with the rollers 45 to the right in FIG. 1. Upon such movement the balls 47 are moved inwardly towards the axis 14 along the frusto-conical surface 49 and the rollers 45 simultaneously move to inoperative positions in which they are out of circumferential alignment with respect to the stops 40.

Such axial displacement of the ring member 43 and of the rollers 45 from their operative to their inoperative positions is effected by the operation of five liquid-pressure-operable pistons 50 which bear upon the member 43. The cylinders 51 in which these pistons are slidably mounted have their axes parallel with the rotational axis 14, and each cylinder is housed within a respective one of the vanes 25 of the component 16 of the actuator 13. In the manner shown in FIG. 1 a passageway 52 communicates with a respective chamber 53 to the left of each piston 50, all these passageways being on communication by means (not shown) with a source of liquid under pressure. Admission of liquid under pressure into the passageways 52 is by way of a stop control valve (not shown).

In operation of the bladed rotor, for pitch control of the blades 31 in the positive pitch range the stop control valve is closed so that no pressure liquid is delivered into the passageways 52 associated with the chambers 53. Hence the pistons 50 remain in the position shown in FIG. 1 and the balls 47, which form loading means for the rollers 45, are held under centrifugal force, due to rotor rotation, in the position shown by the full circle. Through the intermediary of the ring member 43 the balls 47 maintain the rollers 45 in their operative positions as shown in FIG. 1. With the rollers so positioned they project into the paths of circumferential movement of the stops 40.

For operation of the actuator 13 for pitch-coarsening of the blades 31 five alternate chambers 26 are chargeable with liquid under pressure while the other five chambers are placed in communication with drain. Conversely said other five chambers 26 are chargeable with liquid under pressure for operation of the actuator for pitchfining of the blades, while the first-mentioned five chambers are placed in communication with drain. The direction of pressure liquid to and from the actuator is under the control of suitable pitch control valve means (not shown). Upon operation of the actuator the components 15 and 16 rotate by equal amounts in opposite directions, this relative rotation producing a balanced driving effect, by way of bevel gearing 19, 29 and 33, upon the blades to change their pitch.

If extreme pich-fining is selected by the pitch control valve means associated with the actuator 13, the components 15 and 16 of the actuator are relatively rotated until at a predetermined relative rotational position thereof each stop 40 and its associated roller 45 simultaneously come into engagement, whereupon further movement of the actuator and thus of the blading in the pitch-fining direction cannot occur.

In this embodiment such arrest of actuator and blade movement in the pitch-fining direction occurs at a blade angle of 0 degrees, being the mimimum permissible fine-pitch angle for the blades when an aircraft, in which the bladed rotor and its associated engine are fitted, is coming in to land.

When, following touch-down of the aircraft, it is desired to move the blades 31 into the negative pitch range for the purpose of aerodynamic braking of the aircraft by the bladed rotor, it is necessary for the fine pitch stop means 40/45 to be rendered ineffective. This is achieved by firstly effecting adjustment of the actuator so that the stops 40 and rollers 45 are just out of engagement and then opening the stop control valve thus causing liquid under pressure to enter the passageways 52. In this way all of the pistons 50 are displaced axially to the right in FIG. 1 moving the ring member 43 and the rollers 45 axially to the right likewise against the effort of the loading means formed by the balls 47. The liquid pressure in the chambers 53 is sufficient to cause the balls 47 to move inwardly against centrifugal force towards the axis 14 along the frusto-conical surface 49 to the position indicated by the dotted circle in FIG. 1B. At this position of the balls 47 the rollers 45 are positioned sufficiently far to the right as to be out of circumferential alignment with respect to the stops 40, whereupon further relative rotational movement of the components 15 and 16 of the actuator can now occur under the control of the pitch control valve means so that the blades move beyond the 0° pitch position into the negative pitch range.

When it is required to move the blades 31 back into the position pitch range the pitch control valve means is set to demand pitch-coarsening whereupon the five coarse pitch chambers 26 of the actuator are charged with liquid under pressure and the five fine pitch chambers 26 are placed in communication with drain. As soon as the stops 40 have reached the positive pitch side in the circumferential sense of the rollers 45, the stop control valve is closed and the chambers 53 associated with the pistons 50 are placed in communication with drain. Consequently the balls 47 are able to move under centrifugal force away from the axis 14 along the frusto-conical surface 49 to the position shown by the full line circle in FIG. 1B, so that the rollers 45 and the ring member 43 are displaced to the left in that figure. Hence the rollers are repositioned so that they again project into the paths of circumferential movement of the stops 40 to re-impose the limit of 0° on subsequent pitch-fining of the blades 31.

The external peripheral surface of the ring member 43 is of slightly barrel-like shape to avoid binding of that member with respect to the annular member 28 during its axial movement.

The above-described stop means is regarded as forming what is termed a "passive stop" in that it permits operation of the rotary actuator and the blading in the positive pitch range, but the rollers 45 are then in circumferential alignment with the stops 40 in readiness to be engaged thereby. To move the blades into the negative pitch range it is necessary to move the rollers 45 out of such alignment to allow the components of the actuator to move further as necessary relatively to one another.

The rotary actuator may also include what is termed an "active lock" and means forming such a lock, as disclosed in the Specification of my Application of even date herewith (Dowty Rotol Limited's Case No: E-2317), are generally indicated at 60 in FIG. 1.

The invention is not limited to rotary actuators of the balanced-vane-type as in other embodiments the rotary actuators may be of the non-balanced type in which one main actuator component is adapted for mounting fast with respect to a member, for example, the hub of a bladed rotor, while the other main actuator component is rotatable with respect to said one main actuator component in either direction.

Again, the invention is not limited to actuators of the vane-type, as in other embodiments the rotary actuators may be of other type.

Finally, the invention is not limited to rotary actuators for bladed rotors as in other embodiments rotary actuators in accordance with the invention may with advantage be used with other devices requiring the provision in the actuators of intermediate withdrawable stop means.

I claim:

1. A rotary actuator fitted to a rotor having flow-varying blading for effecting adjustment of the blading, including two relatively-rotatable and co-axially-disposed main actuator components, each of said components carrying respective abutment means positioned in predetermined manner thereupon and one of the abutment means being axially-displaceable with respect to its component between an operative position and an inoperative position, loading means comprising a plurality of balls, and a frusto-conical surface, carried by one of said components, with which said balls are co-operable for ensuring, during rotation of the rotor, that the balls, under centrifugal force acting upon them, bias the displaceable abutment means in a direction towards said operative position, the two abutment means being so disposed with respect to their components that during operation of the actuator with said displaceable abutment means in the operative position, the two abutment means co-operate to arrest relative rotational movement of said components only upon said components reaching a predetermined relative rotational position.

2. A rotary actuator, suitable for use with rotors having flow-varying blading for effecting adjustment of the blading, including two relatively-rotatable and co-axially-disposed main actuator components, each of said components carrying respective abutment means positioned in predetermined manner thereupon, the abutment means of one of said components comprising a plurality of stop elements each individually axially-displaceable with respect to that component between an operative position and an inoperative position, and the abutment means of the other component comprising a plurality of projections which are co-operable with said stop elements and which are fast with that other component, displacing means provided within said one of said components for effecting axial displacement of said stop elements in one direction, and loading means for biassing the stop elements in opposition to said displacing means, the two abutment means being so disposed with respect to their components that during operation of the actuator with the abutment means of said one of said components in the operative position, the two abutment means co-operate to arrest relative rotational movement of said components only upon said components reaching a predetermined relative rotational position.

3. A rotary actuator, fitted to a rotor having flow-varying blading for effecting adjustment of the blading, including two relatively-rotatable and co-axially-disposed main actuator components, with their common rotational axis coincident with the axis of rotation of the rotor and each of said components carrying respective abutment means positioned in predetermined manner thereupon, displacing means provided within one of said components for effecting axial displacement of the abutment means of that component with respect thereto between an operative position and an inoperative position, and loading means comprising a plurality of elements responsive to centrifugal force, and a surface fast with one of said components with which said elements are co-operable for ensuring that during rotation of the rotor the elements, under centrifugal force acting upon them, bias the axially-displaceable abutment means in opposition to said displacing means, the two abutment means being so disposed with respect to their components that during operation of the actuator with the displaceable abutment means in the operative position, the two abutment means co-operate to arrest relative rotational movement of said components only upon said components reaching a predetermined relative rotational position.

4. A rotor having flow-varying blading and provided with a single rotary actuator, the rotational axis of which is co-incident with the axis of rotation of the rotor, means for translating rotary output movement of said actuator into adjustment of the blading for varying flow of fluid over the blading, and said actuator including two relatively-rotatable and co-axially-disposed main actuator components each of which carries respective abutment means positioned in predetermined manner thereupon, displacing means provided within one of said components for effecting axial displacement of the abutment means of that component with respect thereto between an operative position and an inoperative position, and loading means operable under centrifugal force during rotation of the rotor for biassing the axially-displaceable abutment means in opposition to said displacing means, and the two abutment means being so disposed with respect to their components that during operation of the actuator with the displaccable abutment means in the operative position, the two abutment means co-operate to arrest relative rotational movement of said components only upon said components reaching a predetermined relative rotational position.

5. An actuator as claimed in claim 2, wherein the actuator is of vane-type, and said displacing means is fluid-pressure-operable and comprise a plurality of axially-disposed devices provided within respective vanes of said one of said components.

6. An actuator as claimed in claim 3, wherein said displacing means comprise fluid-pressure-operable devices.

7. An actuator as claimed in claim 3, wherein said displaceable abutment means comprises a plurality of rollers circumferentially-spaced with respect to their component, and the abutment means of the other component comprises a pluality of projections circumferentially-spaced with respect to that component.

8. An actuator as claimed in claim 6, wherein the actuator is of the vane-type and said main actuator components are of multi-vaned form.

9. An actuator as claimed in claim 8, wherein said actuator is of the balanced kind.

10. An actuator as claimed in claim 8, wherein said devices each comprise a piston and cylinder housed at least in part in a respective vane of the actuator.

11. An actuator as claimed in claim 2 and fitted to a bladed rotor for adjustment of the blading thereof.

* * * * *